United States Patent [19]

Decker

[11] Patent Number: 5,555,593

[45] Date of Patent: Sep. 17, 1996

[54] VEHICLE DRYING OR POLISHING APPARATUS

[75] Inventor: Wolfgang Decker, Zusmarshausen-Wollbach, Germany

[73] Assignee: Wesumat Fahrzeugwaschanlagen GmbH, Augsburg, Germany

[21] Appl. No.: 359,576

[22] Filed: Dec. 20, 1994

[30] Foreign Application Priority Data

Jan. 27, 1994 [DE] Germany .................. 44 02 332.4

[51] Int. Cl.⁶ ................................................ B60S 3/04
[52] U.S. Cl. ................ 15/302; 15/312.1; 15/316.1; 15/97.3; 34/95
[58] Field of Search ................ 15/97.3, 316.1, 15/405, 302, 312.1; 34/95, 216, 217, 335

[56] References Cited

U.S. PATENT DOCUMENTS

| | | | |
|---|---|---|---|
| 1,723,441 | 8/1929 | Richards | 34/95 |
| 4,166,302 | 9/1979 | Kim | 15/97.3 |
| 4,166,303 | 9/1979 | Fromme | 15/97.3 |
| 4,178,648 | 12/1979 | Gougoulas | 15/97.3 |
| 4,949,423 | 8/1990 | Larson et al. | 15/316.1 |
| 4,967,442 | 11/1990 | Weigele | 15/97.3 X |

FOREIGN PATENT DOCUMENTS 3837928  2/1990  Germany .

OTHER PUBLICATIONS

Company brochure WESUMAT softwash washing line system 880811 of the company WESUMAT Fahrzeugwaschanlagen GmbH, D–86156, Augsburg.

*Primary Examiner*—Chris K. Moore
*Attorney, Agent, or Firm*—Flynn, Thiel, Boutell & Tanis, P.C.

[57] ABSTRACT

The vehicle drying or polishing apparatus is equipped with device moving the vehicle relative to the apparatus. A flexible, drivable, endless conveyor member (3) is guided in a horizontal plane above the path of the vehicle by a plurality of deviating wheels (7, 8) arranged on both longitudinal sides of the apparatus and rotating about vertical axes (V), and is provided with a plurality of narrow strips (5) of absorbent material, connected to the conveyor member and hanging down vertically therefrom, being movable by means of the conveyor member transverse to the path of relative movement of the vehicle. The conveyor member (3) has two strip-free sections (3a) whose respective lengths (L) correspond at least to the greatest vehicle width. The two sections (3b) of the conveyor member (3) lying between the strip-free sections (3a) are equipped with many strips (5) such that, in the rest position of the conveyor member (3) strips only hang down on the two sides of the vehicle, outside its path of relative movement, and within the path of relative movement two strip-free gaps are formed.

7 Claims, 4 Drawing Sheets

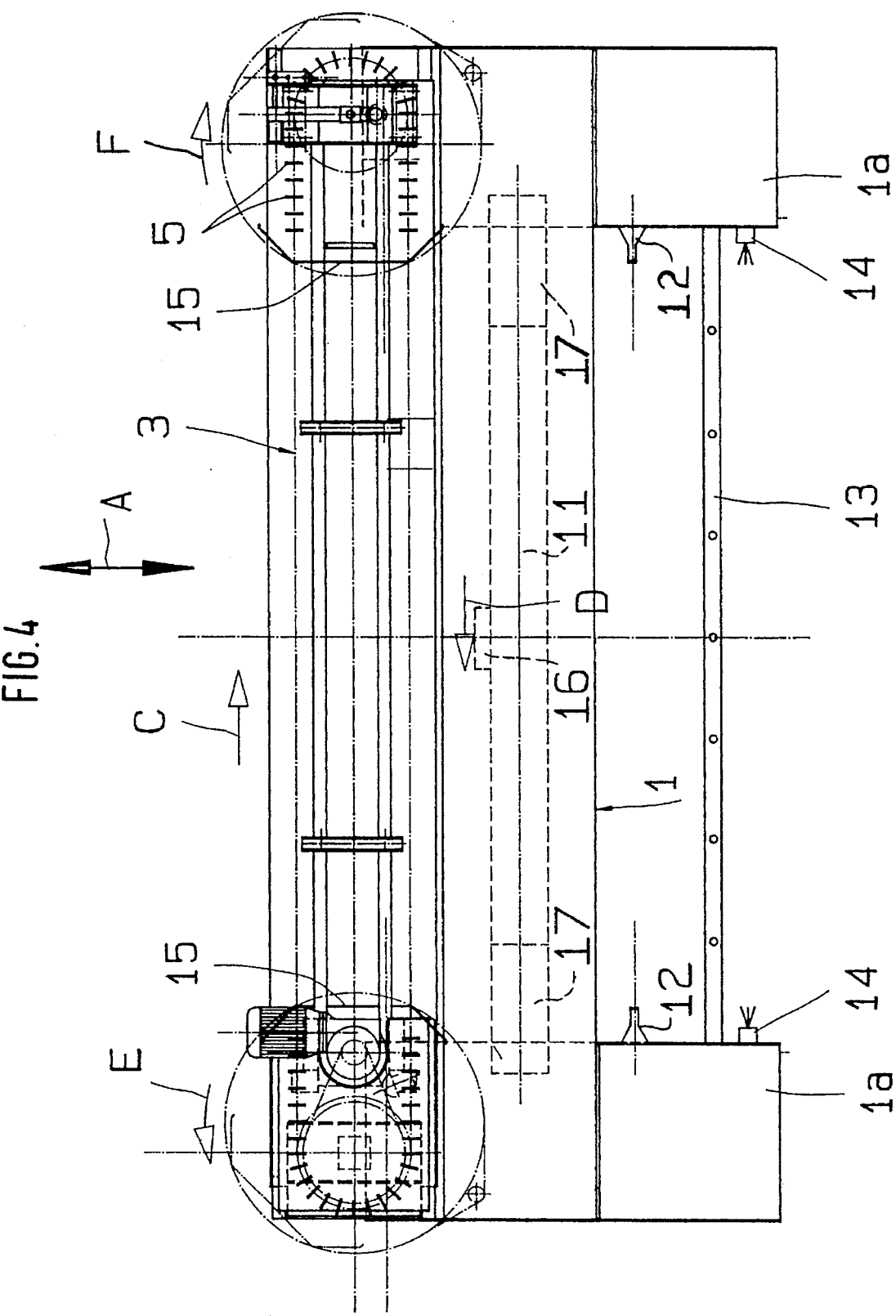

VEHICLE DRYING OR POLISHING APPARATUS

This invention relates to a vehicle drying or polishing apparatus with a device moving the vehicle relative to the apparatus, a flexible, drivable, endless conveyor member guided in a horizontal plane above the path of the vehicle by a plurality of guide wheels arranged on both longitudinal sides of the apparatus and rotating about vertical axes, and a plurality of narrow strips of absorbent material, such as textiles, foam material, leather and leather-like plastics, connected to the conveyor member and hanging down vertically therefrom and which are movable by means of the conveyor member transverse to the path of relative movement of the vehicle.

Such apparatuses are used in vehicle washing installations as so-called cloth driers or cloth polishers. In this it can however be the case that the cloth drier of cloth polisher is not used at all or is only put into operation after completion of other treatment processes. The former is the case for example when the apparatus is used in a washing line for example as a polishing device at the end of the washing line. If a customer does not want to have his vehicle polished for reasons of cost, the vehicle must nevertheless be moved through the quiescent polishing apparatus. Since the strips can then catch on the vehicle and be worn unnecessarily, they have to be removed from the path of movement of the vehicle by suitable measures. In gantry washing installations, in which the vehicle is stationary during the treatment of the vehicle and the gantry is moved to and fro relative thereto several times, problems can also arise if the cloth drier or cloth polisher is only used at a later point in time or even not at all. If for example the gantry on which the cloth drier or polisher is fitted is also used for spraying a washing medium for the chemical pre-wash or for application of a wax, the strips hanging down from the conveyor member over the conveyor member are drawn over the vehicle and are wetted by the washing water or are contaminated by the wax. Problems would then also arise when the cloth drier is used in combination with a blower device on a drying gantry. In washing lines in which the vehicle is drawn through various treatment stations by an endless conveyor belt, it is known that, at the end of the washing line there is firstly a blower device with which the greater part of the water is blown off the surface of the vehicle. Since however it is not possible to avoid some drops remaining on the surface of the vehicle, the blower drier is followed by a cloth drier in order also to remove the remaining drops from the surface of the vehicle. (See the company brochure WESUMAT softwash washing line system 880811 of the company WESUMAT Fahrzeugwaschanlagen GmbH, D-86156, Augsburg). In order to avoid damage to the strips, unnecessary usage of the same and other effects when they are not being used, it is known from DE 3 837 928 C1 to provide a device operating directly or indirectly on the strips by means of a stepping motor, with which the strips can be brought out of the path of the vehicle when they are not in use. Several such devices are described in the cited document but these require a substantial mechanical outlay.

The invention is therefore based on the object of providing a vehicle drying or polishing apparatus of the kind initially referred to in which the strips can be brought out of the path of relative movement of the vehicle without additional mechanical outlay and which is thus distinguished by a particularly simple construction.

This is achieved in accordance with the invention in that the conveyor member has two strip-free sections whose respective lengths correspond at least to the greatest vehicle width, and in that the two sections of the conveyor member lying between the strip-free sections are equipped with many strips such that, in the rest position of the conveyor member strips only hang down on the two sides of the vehicle, outside its path of relative movement, and within the path of relative movement two strip-free gaps are formed, lying one behind the other in the direction of relative movement of the vehicle.

The invention thus proceeds from the idea of not equipping the conveyor member uniformly with strips but of providing two strip-free sections on the conveyor member, with two intervening sections equipped with strips. When the drying or polishing apparatus is not in use, the conveyor member is so arrested that its sections with strips are located in the region of the guide wheels at the sides of the path of movement of the vehicle, outside the same, and that the two strip-free sections are located above the path of movement of the vehicle and extend transverse to the direction of relative movement thereof. Since the strip-free sections correspond to at least the greatest vehicle width, there is a strip-free gap under each strip-free section through which the vehicle can pass through relative to the drying or polishing apparatus, without the strips located in the rest position to the side of and outside the path of movement coming into contact with the vehicle. The passage of the vehicle is not affected when the drying and polishing apparatus is not used and conversely the strips cannot affect the other treatment operations in a vehicle washing installation. In particular, the strips cannot be inadvertently wetted, or be contaminated with wax or be worn out mechanically or be damaged. Since the apparatus does not require any special mechanical devices, apart from a suitable sensor or limit switch which stops the conveyor belt in the right position, whereby the strips can be brought out of the path of vehicle movement when not in use, a simpler construction and greater operating reliability are attained. Moreover maintenance costs for servicing such a device are saved.

A particularly advantageous design of the invention consists in that the conveyor member and its guide wheels are mounted in a gantry which can be driven to and fro in the longitudinal direction of the vehicle and in that a blower device and/or a spray device for spraying a treatment medium on to the vehicle is arranged spaced from the conveyor member in the direction of movement of the gantry. In gantry washing installations in which one or more gantries are moved over the vehicle several times, in order to be able to carry out different treatment operations in succession, the direct result is that the strips of the drying or polishing apparatus do not hang in the path of movement of the vehicle when they are not being used.

Further advantageous arrangements of the invention are characterized in the other dependent claims.

The invention will be described in more detail below with reference to embodiments shown in the drawings, in which:

FIG. 4 is a plan view of a second embodiment.

Figure 1:
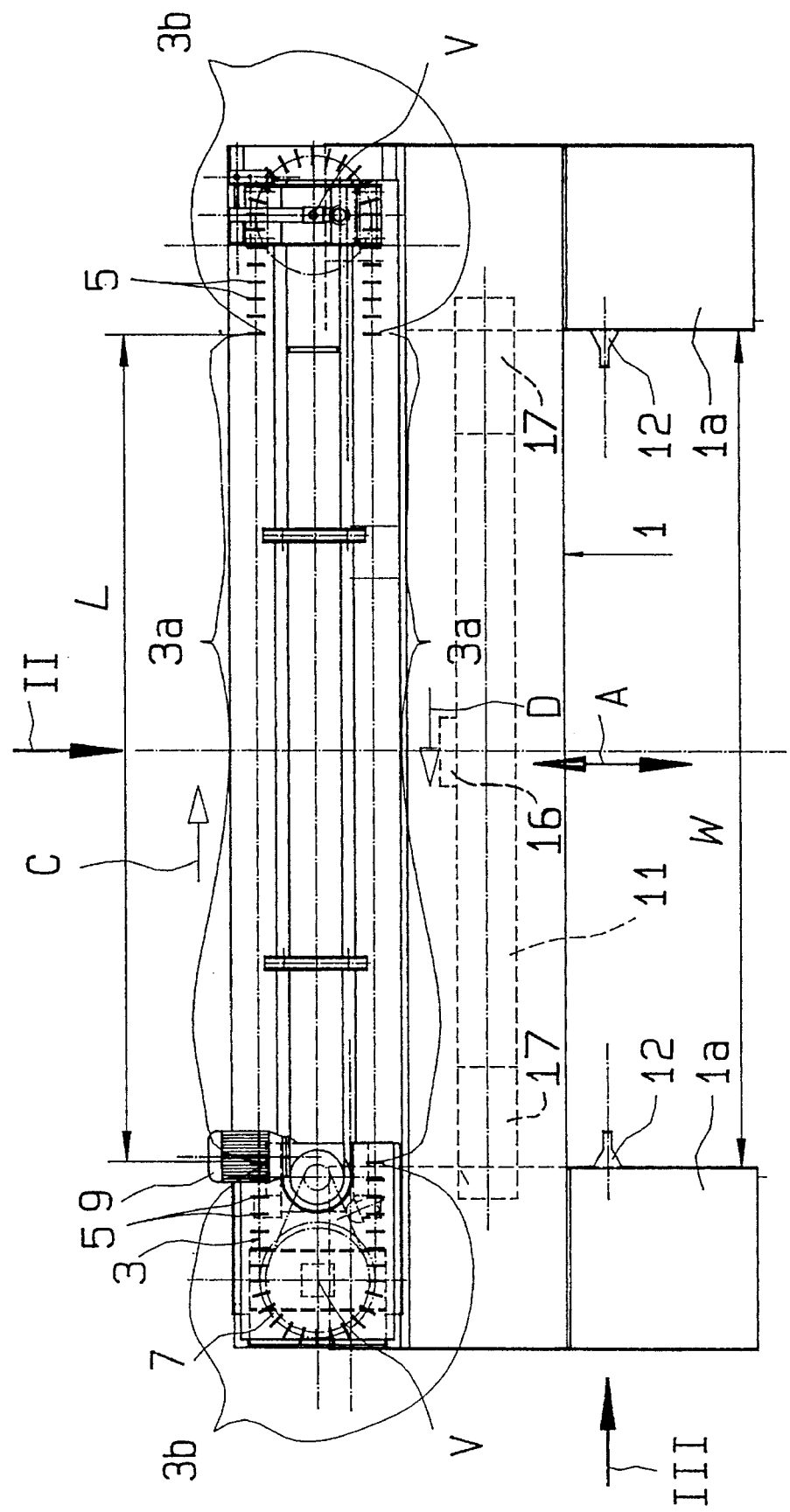
FIG. 1 is a plan view of a gantry drying apparatus.
Figure 2:
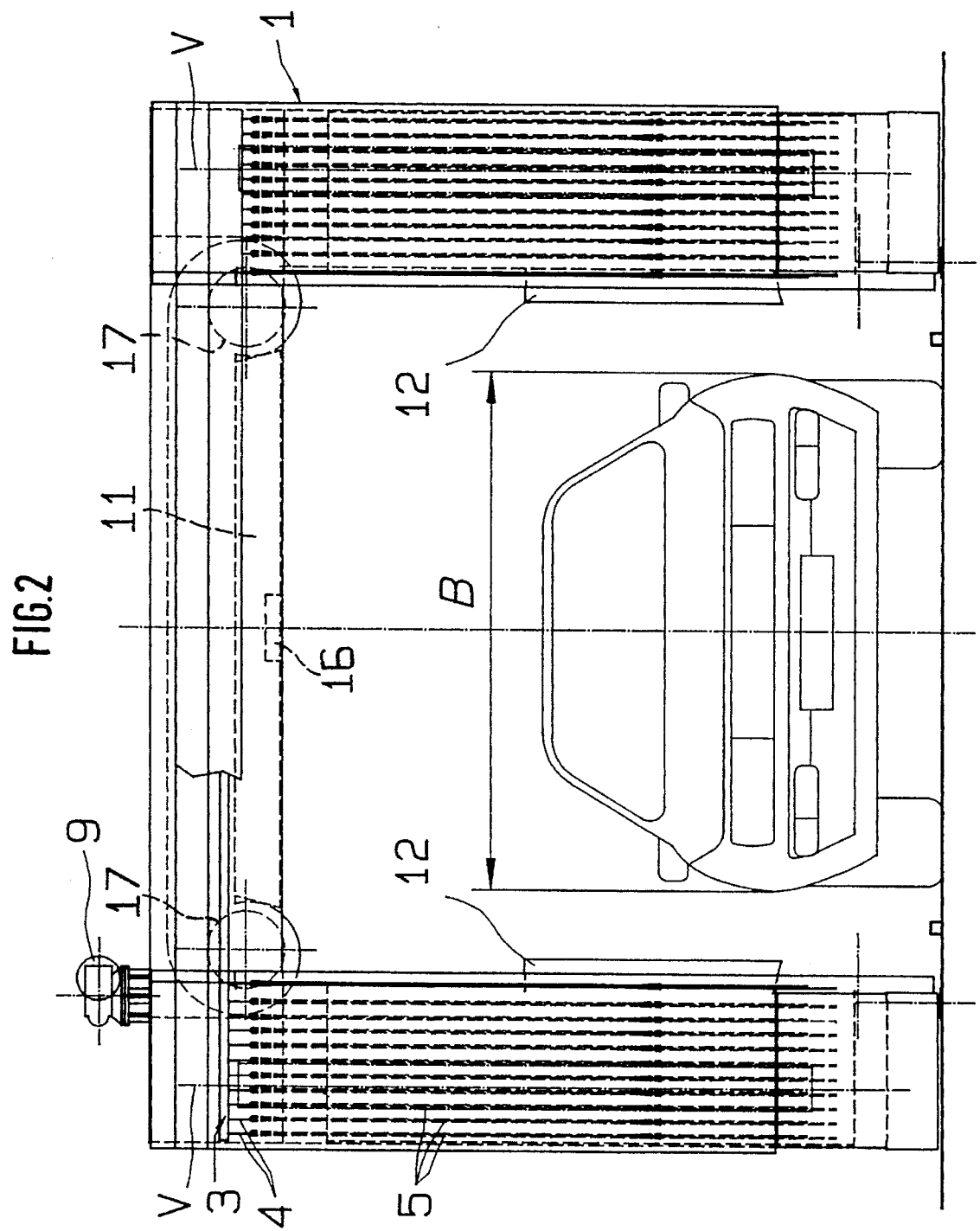
FIG. 2 is an end view of the same in the direction II in FIG. 1.
Figure 3:
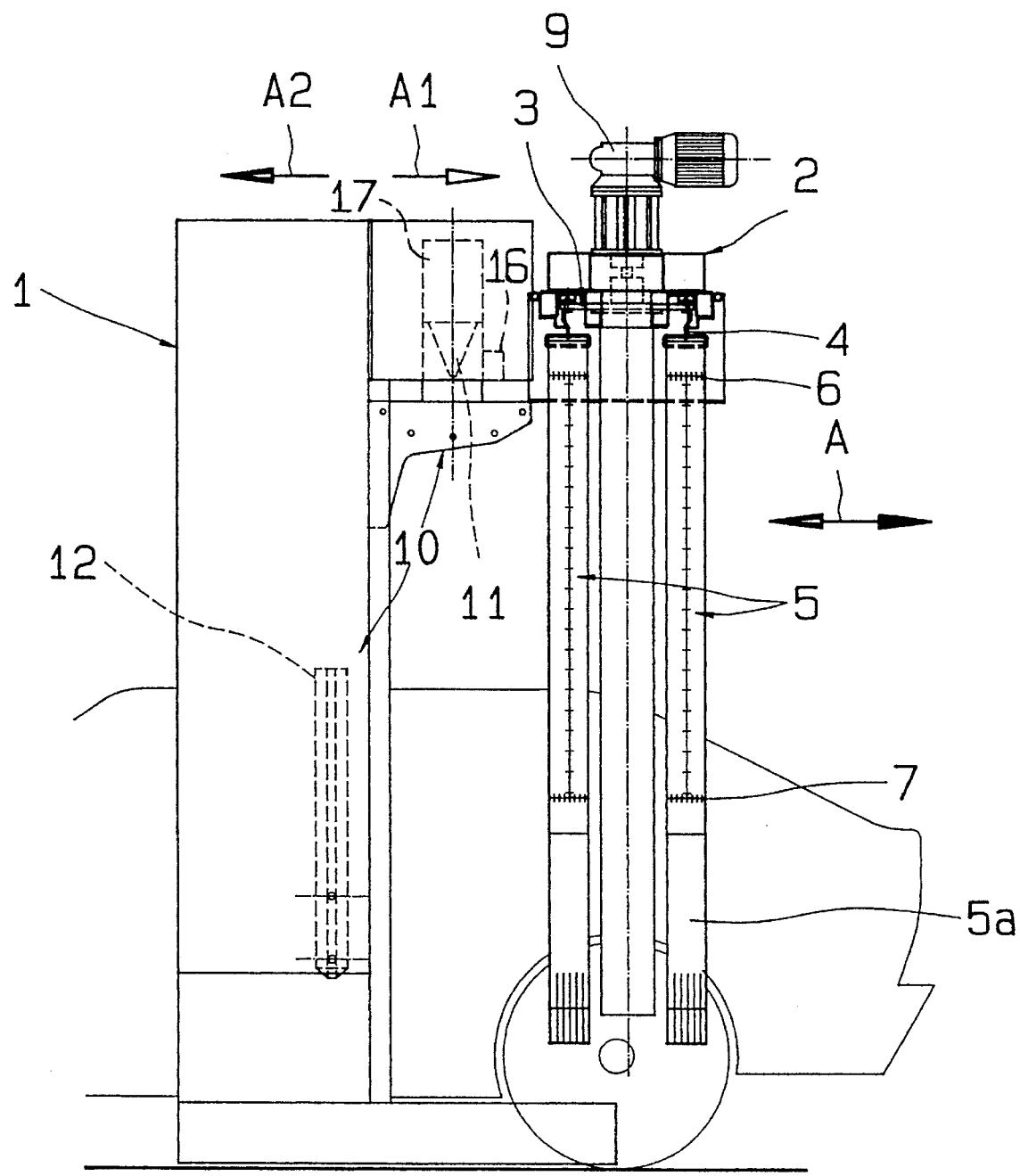
FIG. 3 is a side view of the same in the direction III in FIG. 1.

The invention will be explained in more detail with reference to gantry drying apparatuses for which the arrangement according to the invention is particularly suited. The gantry 1 can be driven to and fro horizontally in the longitudinal direction A of the vehicle. During the treatment, i.e. during the washing or drying, the vehicle is at rest, so that the relative movement between the vehicle and the gantry 1 is effected solely by the movement of the gantry 1. A cloth drier 2 is arranged on the gantry 1, its main parts being known per se. It comprises an endless conveyor member 3 in a horizontal plane above the path of movement of the vehicle, formed as a conveyor chain as a rule. A plurality of yokes 4 are fixed on this conveyor member 3, each serving to receive a strip 5 which hangs down freely. This narrow strip 5 can consist wholly or in part of absorbent material. such as textiles, foamed material, leather, leather-like material or even fleece. In order that the strips can be easily exchanged when needed when damaged, each strip has a burr fastener 6 in the region of the yoke 4. It is also possible to provide a further burr fastener in the lower region of the strip 5, so that just the lower part 5a of each strip can be exchanged. The endless conveyor member 3 is guided over a guide wheel 7, 8 at each side of the gantry 1, the guide wheel 7 being drivable by the motor 9. The guide wheels 7, 8 rotate about vertical axes V.

While the yokes or strips are normally uniformly distributed over the whole length of the flexible, endless conveyor member 3 in cloth driers of this kind, the invention provides for a non-uniform distribution. The conveyor member 3 has two sections 3a on which no yokes or strips are arranged.

These sections 3a are referred to as "strip-free" sections. In between the two strip-free sections 3a the conveyor member 3 has sections 3b each equipped with strips. The yokes 4 and the strips 5 are therefore only arranged on the sections 3b. The length L of the strip-free sections 3a must be greater than the greatest width B of the largest vehicle to be dried with the apparatus. The length L preferably corresponds to the clear width W of the gantry 1.

A blower device 10 is arranged alongside the conveyor member 3 spaced therefrom in the direction of movement A of the gantry. This device consists of a horizontal blower nozzle 11 extending transverse to the longitudinal direction of the vehicle, i.e. transverse to the direction of movement A, and a vertical blower nozzle 12 arranged on each upright 1a of the gantry 1. The horizontal blower nozzle 11 can be mounted to be adjustable in height and its height movement can advantageously be controlled by a sensor device 16 sensing the shape of the vehicle acting through a nozzle movement device.

After washing the vehicle by means of a washing gantry, not shown, the vehicle can be dried with the drying apparatus according to the invention. The endless conveyor member 3 is stopped in the preceding drying operation as is shown in the drawings. In this rest position of the conveyor member the two strip-free sections 3a are located above the through passage region of the gantry, i.e. above the path of relative movement of the vehicle with respect to the gantry. In this way two gaps are formed lying one behind the other in the direction of movement A of the gantry 1, i.e. in the direction of relative movement of the vehicle with respect to the gantry, their width corresponding to the length L of the strip-free sections 3a. The sections 3b of the conveyor member 3 equipped with strips 5 are located on the two sides of the gantry in the rest position of the conveyor member, in the region of the turn-round locations formed by the guide wheels 7, 8, outside the path of relative movement of the vehicle. The strips 5 therefore cannot come into contact with the vehicle in this rest position of the conveyor member 3. In order to effect the drying of the vehicle, the gantry is first moved back over the vehicle in the direction A1 from left to right and the greater part of the water on the surface of the vehicle is blown off by the blower nozzles 11, 12. After the gantry has moved back over the whole vehicle, the blower is stopped and the direction of travel of the gantry is reversed. While the gantry 1 now moves in the direction A2 from left to right over the vehicle, the conveyor member 3 is driven in the direction C, D by means of the motor 9. The strips 5 are thus moved in the directions C and D during the gantry movement in the direction A2. They are thereby pulled over the surface of the vehicle and thus suck up the residual drops left on the vehicle surface. Since the transverse movement of the strips in the directions C and D is superimposed on the longitudinal movement of the gantry in the direction A2, the strips 5 are pulled diagonally over the surface of the vehicle. After the gantry has moved fully over the vehicle in the direction A2, the motor 9 is so stopped by a suitable limit switch or the like that the two strip-free sections 3a are in the position above the through passage region of the gantry as shown in the drawings, and the sections 3b equipped with strips are arranged on the two sides of the gantry.

If the gantry drying apparatus is also to be used for application of fluid treatment media, for example to apply a washing medium for the chemical pre-wash or for application of liquid wax, then a spray arch 13, 14 consisting of a horizontal part 13 and two vertical parts 14 is arranged on the gantry, in accordance with FIG. 4. In order now that the strips 5 shall not be wetted and/or contaminated by the treatment medium, it is advantageous to provide a movable shield 15 on each side of the gantry 1, which shield can be so swung during operation of the spraying device 13, 14 and in the rest position of the conveyor member 3 that it covers the strips on the inside of the gantry 1 as in FIG. 4. Each shield 15 is advantageously pivoted about a vertical axis and can be swung out in the directions E and F respectively by means of a suitable positioning motor, when the cloth drier is to be put into operation.

The invention can also be used with advantage in washing lines in which the vehicle is drawn through the stationary treatment stations, for example as a polishing apparatus at the end of the washing line. The conveyor member 3 is then normally so arranged in the rest position that the strip-free sections 3a are located above the path of movement of the vehicle and the two aforesaid gaps are present in the region of movement of the vehicle. The vehicle can then pass the polishing apparatus without the strips being contacted by the vehicle. If however the customer wishes to have his vehicle polished and has paid for this, the conveyor member 3 is set in motion while the vehicle is drawn through the polishing apparatus. The strips are then drawn diagonally over the surface of the vehicle in the manner previously described.

I claim:

1. In a vehicle drying or polishing apparatus with a device moving the vehicle relative to the apparatus, a flexible, drivable, endless conveyor member guided in a horizontal plane above a path of movement of the vehicle by a plurality of guide wheels arranged on both longitudinal sides of the apparatus and rotating about vertical axes, and a plurality of narrow strips of absorbent material connected to said conveyor member and hanging down vertically therefrom and which are movable by means of said conveyor member transverse to said path of movement of the vehicle, the improvement wherein said conveyor member has two strip-free sections whose respective lengths correspond at least to the greatest vehicle width, and wherein two further sections of said conveyor member lie between said strip-free sections and are each equipped with a plurality of strips, whereby when in an at rest position of said conveyor member, said plurality of strips hang down only on opposite sides of the vehicle, outside said path of movement of the vehicle, and within said path of movement two strip-free gaps are formed, lying one behind the other in said path of movement of the vehicle.

2. The apparatus according to claim 1, wherein said conveyor member and said guide wheels thereof are mounted in a gantry said gantry being drivable to and fro in a longitudinal direction of the vehicle, and wherein a blower device is arranged spaced from said conveyor member in a direction of movement of said gantry.

3. The apparatus according to claim 2, wherein said blower device has a horizontal blower nozzle placed transverse to said longitudinal direction of the vehicle, and a vertical blower nozzle on opposite sides of said gantry.

4. The apparatus according to claim 3, wherein said horizontal blower nozzle includes a sensing means for detecting the vehicle height and a nozzle movement means for raising and lowering said horizontal blower nozzle corresponding to the vehicle height as detected by said sensing means.

5. The apparatus according to claim 2, wherein a movable shield is provided on opposing sides of said gantry so as to cover said strips in said at rest position of said conveyor member.

6. The apparatus according to claim 5, wherein said movable shield is pivotal about a vertical axis.

7. The apparatus according to claim 1, wherein said conveyor member and said guide wheels thereof are mounted in a gantry, said gantry being drivable to and fro in a longitudinal direction of the vehicle, and wherein a spray device for spraying a treatment medium on the vehicle is arranged spaced from said conveyor member in a direction of movement of said gantry.

* * * * *